Dec. 19, 1967  L. D. OAKMAN  3,359,361
INSULATING DEVICE FOR WIRE AND CABLE ENDS
Filed March 11, 1966
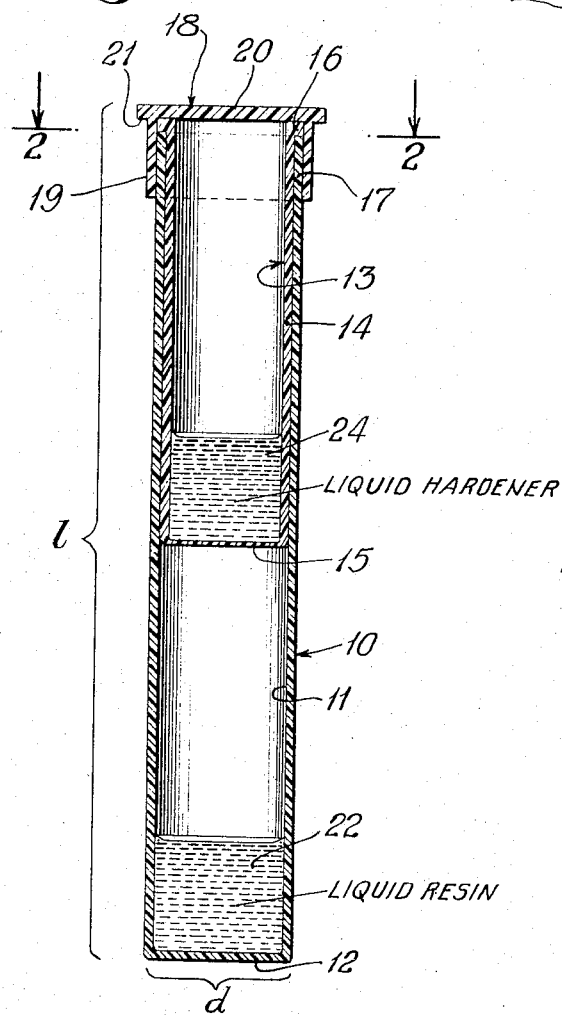
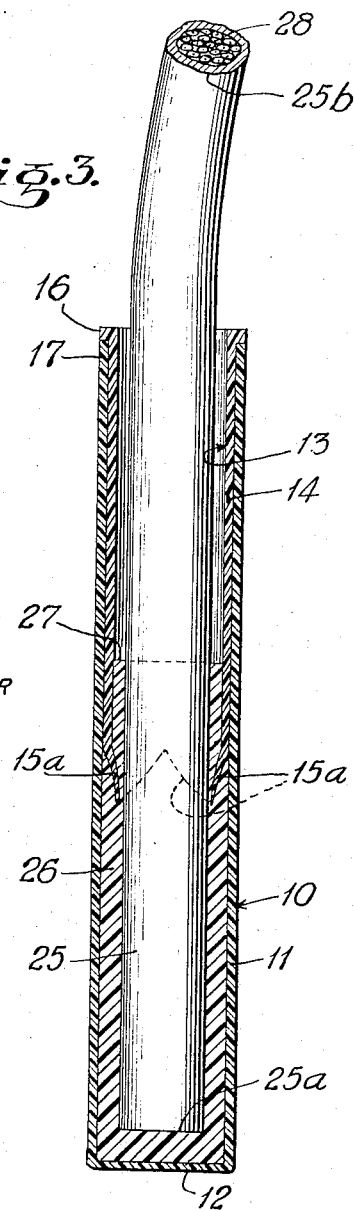
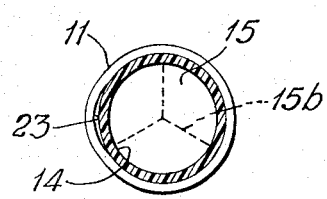
INVENTOR.
LOUIS D. OAKMAN
BY
ATTORNEY United States Patent Office 3,359,361
Patented Dec. 19, 1967

3,359,361
INSULATING DEVICE FOR WIRE AND CABLE ENDS
Louis Dean Oakman, Olean, N.Y., assignor to Hysol Corporation, Olean, N.Y., a corporation of New York
Filed Mar. 11, 1966, Ser. No. 533,625
3 Claims. (Cl. 174—76)

ABSTRACT OF THE DISCLOSURE

An insulating device for cable ends comprising an elongated plastic casing of generally cylindrical contour, thin-walled partition means substantially midway between the ends of said casing dividing the same into separate compartments, said compartments containing liquid resin and liquid hardener components of a thermosetting resin system, means permanently closing one end of said casing, detachable closure means at the other end of said casing facilitating insertion of a cable end to rupture said thin-walled partition means for mixing of the resin components, the combined volume of said liquid resin and hardener components being equivalent to approximately 1/3 the volume of said casing, and said resin and hardener being characterized as providing, when mixed, a resin composition which will gel in less than 2 minutes and reach a substantially complete cure in less than 5 minutes under atmospheric conditions.

The partition means is characterized as being rupturable by the application of less than 3 pounds pressure with a 1/16" probe, and in a preferred device the resin composition will gel in less than 1 minute and reach a substantially complete cure in less than 3 minutes.

---

In the elecrical and communications fields, and particularly in the communications field, where substantial numbers of insulated conductors are assembled together as a single cable, there is a serious problem in effectively protecting terminal ends of such cables both from physical damage and from deterioration due to atmospheric conditions and/or exposure to contaminants which may be in the surrounding enviroment. It is well known to those versed in the communications are that failure to effectively protect terminal ends of wires and cables during periods prior to use or periods of nonuse can result in subsequent failures when later put to use. This appears to be due to the fact if a cable end is left unprotected moisture and various vapors and chemicals that may be associated with an industrial environment can migrate longitudinally of the individual conductors making up the cable to cause deterioration in either the individual conductor elements, the insulation surrounding such elements, or both of these components. Furthermore, depending upon the duration of exposure to moisture or other environmental conditions, such deterioration may progress a substantial distance along individual conductors so that even the practice of cutting back a portion of the individual conductors and insulation preparatory to the joining of such cable end with other electrical components, may not remove all of the potentially deteriorated conductors and insulation, thus leaving in the assembled cable potential areas of weagness susceptible to future breakdown.

The problems above mentioned become of special significance when it is realized that many installations of communication cables and the like are made with the intenton that they operate trouble-free for periods of the order of twenty years or longer. Furthermore, it is inherently necessary, when installing communication cables and the like to make many cuts and splices and to leave severed ends of cables exposed for indefinite periods. It has been the practice in the past to attempt to protect such exposed end by wrapping with insulating tape. This can, however, be time consuming; and depending upon the environment in which a cable is severed, it may be impossible by this method to prevent entrapment of damaging contaminants.

Another means of protection currently in use involves end caps which are mechanically attached to terminal ends of wires and cables. These are particularly effective with newly manufactured cables since the end caps can be affixed to terminal ends under controlled atmospheric conditions. In the field, however, it is difficult when using such end caps to prevent entrapment of potentially harmful contaminants in an environment. Furthermore, the use of such end caps in the field is not too practical because of the number of different sizes which would have to be carried to meet varying conditions. Furthermore, these devices are generally too costly to be discarded after a single use, and at the same time are arkward to retrieve and store for re-use.

An object of the present invention is to meet the substantial need above described for protective means at terminal ends of wires and cables by providing an inexpensive one-use insulating device which can be quickly and easily applied to a cable end, and which, by its manner of application, can substantially minimize or prevent entrapment of environmental contaminants.

Another object of the invention is to provide an insulating device which is non-critical with respect to the cable size i.e. which may be effectively used with cables of varying lesser diameter than the maximum for which the device is intended, so that a few standard sizes of the device can handle all cable sizes normally encountered in the field.

A still further object of the invention is to provide a device of the character described incorporating liquid resin components in a compartmentized casing so oriented that the normal motion of axial insertion of a cable end acts to rupture the divider means and mix the resin components to provide a rapidly curing thermosetting resin composition.

In accomplishing the foregoing objects an elongated plastic casing of generally cylindrical contour can be provided in various ways with thin-walled partition or divider means forming separate compartments for the liquid components of a thermosetting resin system. For example, compartments for the liquid resin components may be provided by a plurality of essentially tubular casings, closed at one end having slightly different diameters to permit close telescopic engagement therebetween and having relative lengths depending upon the volumes of different liquid resin components to be employed. Generally, a satisfactory resin system can be provided with two liquid components, and the devices will be more specifically described as adapted to a two component system. It is to be understood, however, that the principles of structure and assembly of the device could be adapted to a three component system by utilizing a third telescopic casing part.

The casing parts, and a detachable closure means for the open end of the assemblage are suitably fashioned from a plastic material which is inert to the liquid resin components and to the thermosetting composition produced by mixture of such components. A practical construction material, both from the standpoint of its relative inertness, and ease of fabrication is polyethylene, particularly the so-called low density polyethylene wherein the density is within a range of about 0.910 to 0.925 g./cu. cm. By way of illustration, satisfactory results have been obtained with devices fabricated from polyethylene designated as Type 1 ASTM D1248–63T.

In the structure of the device the essential criticality beyond the use of an inert material, is to control the wall thickness of an end wall in an inner tube which forms a partition between two liquid resin components, so that it will rupture readily upon insertion of a cable end, permitting the liquid resin components to combine as a thermosetting resin mixture. The thickness will, of course, vary to some extent with the diameter in different size devices, but a practical gauge for diaphragm thickness regardless of diameter is that it should rupture upon application of an axial force, using a 1/16 inch probe, of less than three pounds and preferably within the range of about 1.5 to 3 pounds. Once ruptured, the tube end or diaphragm tears easily to accommodate the size cable being inserted.

Various thermosetting resin systems including two (or three) liquid components, and adapted to cure under atmospheric conditions upon mixing of such components, can be used in the device. In order to be practical, bearing in mind that the device is intended for use in the field under widely varied conditions and where time is generally at a premium, the liquid resin system employed in the device should be one which will set or gel in less than two minutes and reach a substantially complete cure within about five minutes. Preferred systems in accordance with the present invention have been found to set or gel in less than one minute and to reach a substantially complete cure in less than three minutes.

The invention will be more fully understood when considered in terms for the following description and the accompanying drawing in which a preferred adaptation of the invention has been illustrated, with the various parts thereof identified by suitable reference characters in each of the views, and in which:

FIG. 1 is a sectional view of a typical device showing liquid resin components in separate compartments and with a closure cap affixed.

FIG. 2 is a section substantially on the line 2—2 of FIG. 1 showing a step in assembling the parts, and FIG. 3 is a view similar to FIG. 1 with the end closure removed and a cable end in engagement with the resin composition.

The insulating device as shown in the drawing comprises a cylindrical outer casing part 10 having side walls 11 and bottom wall 12, a closely interfitting cylindrical inner casing part 13, having side walls 14 and bottom wall 15, with the length or height of said inner casing part 13 being approximately one-half that of the outer casing part 10. The upper end of the inner casing part 13 has an outwardly protruding flange 16 adapted to overlie the upper end 17 of the outer casing part 10 and to terminate substantially flush with the outer surface thereof. A cylindrical closure cap 18 having side walls 19 and end wall 20 closely engages outer surfaces of the casing end 17 and flange 16, and may suitably have a circumferential extension 21 in alignment with the end wall 20 to facilitate grasping of the cap 18 for removing the same.

The casing parts 10 and 13 and cap 18 are molded from suitable plastic material such as low density polyethylene, as above mentioned, and may vary considerably in size to accommodate different size cables. Having reference to the length "$l$" and diameter "$d$" indicated in the drawing these dimensions will generally vary from about $l=3''$ and $d=\frac{1}{2}''$ for handling small cables to about $l=6''$ and $d=3''$ for handling large cables. The wall thickness of the parts will be selected to provide the strength desired in the particular size device, with the bottom wall 15 of the inner casing part being somewhat thinner to provide the easily rupturable characteristic above mentioned. By way of illustration, in a device when the diameter "$d$" is ½ inch, the thickness of the bottom wall 15 of the inner casing part should be about 0.005".

In assembling the device as shown in FIG. 1 a quantity of liquid resin 22 is placed in the casing part 10, and the inner casing part 13 is then slid into place. This operation is facilitated by inserting a small wire or plastic strand 23 between the cylinder walls 11 and 14, as shown in FIG. 2 to permit escape of air from the lower casing part 10. The wire or strand 23 is removed as the flange 16 approaches the casing end 17, and if desired a cement or sealant can be applied between the two before they are brought into close engagement.

In the inner casing part 13 a quantity of liquid hardener 24 is added, either before or after its insertion in the casing part 10, and as a final step in completing the assemblage the closure cap 18 slid over the preassembled parts. Here again the use of a wire or strand 23, as described in FIG. 2, will aid in the escape of air as the close fitting cap 18 is slid into place.

The proportions of resin 22 and hardener 24 will depend, of course, on the particular thermosetting resin system being used, but the combined volume of resin and hardener should not exceed about ½ of the total volume of the assemblage after the wall 15 has been ruptured. This permits a cable 25 to be inserted to rupture the wall 15 without overflow of the hardener, thereby permitting resin and hardener to mix. Movement of the cable then acts to blend the mixture to a uniform thermosetting resin composition which sets around the cable end as seen at 26 in FIG. 3 with an upper surface 27 which is substantially below the upper end 17 of the outer casing 10. The exact location of the upper surface 27 of the set resin will depend upon the size or diameter of the cable 25 and the distance between the cable end 25a and the end wall 12 as the composition sets. This latter distance should preferably be at least as great as the average distance from the cable 25 to the casing side walls 11, and reasonable care should be taken to center the cable end 25a within the casing before the resin composition sets.

It will be noted that the ruptured parts of the wall 15 become embedded in the setting resin composition as seen at 15a, and if desired the wall 15 can be provided with weakened portions as seen at 15b in FIG. 2 to control the rupture pattern and enable the ruptured portions 15a to act as a centering means for the cable.

In FIG. 3 of the drawing the cable end 25a has been shown as a cleanly cut end, since this is considered to be representative of a major field of use of the device. It will be understood, however, that the cable end may have some or all of the individual conductors 28 protruding beyond the outer shell or sheath 25b. The conductors may thus protrude a distance equal to two or three times the diameter of the cable 25 so long as all of the protruding conductor length and part of the sheath 25b can be enveloped by the body of setting resin 26.

The composition of the liquid resin 22 and the liquid hardener 24 is not critical in the sense that various thermosetting resin systems are known comprising liquid resin and liquid hardener which, upon mixing under atmospheric conditions will set or gel in less than two minutes and reach a substantially complete cure within about 5 minutes. The practicality of the device for use in the field, however, is enhanced by further shortening of the setting and curing time, and as earlier mentioned, preferred systems for use in the device are those which will set or gel in less than one minute and reach a substantially complete cure in less than three minutes.

A system which provides this preferred performance consists of two parts by weight of polyisocyanate having a molecular weight of 300 to 400 as the liquid resin component and 1 part by weight of NNN'N'-tetrakis - (2 hydroxypropyl) ethylene diamine as the liquid hardener component. This system at 25° C. in a 10 g. mass has a pot life (or time for mixing) of 35 seconds, a gel time of 50 seconds and a cure time of < 3 minutes, with the cured composition having a hardness (ASTM D1706) of 86, a tensile strength at 25° (ASTM D638) of 6100 p.s.i., and a dielectric strength (ASTMD 149) of 680 volts/mil.

The cured resin does not adhesively bond to the polyethylene casing parts but is so closely engaged with the inner walls and interlocked with the ruptured wall parts 15a that removal is impossible except by cutting or slitting the casing parts. In fact it is intended that the casing parts be left in place as added protection to the sealed off cable end.

The use of interfitting telescopic parts to provide a thin-walled rupturable partition in the elongated casing part of the device is but one of many ways in which a tubular casing can be divided. While the use of the telescopic interfitting parts is considered advantageous from both the fabrication and assembly standpoints, it is to be understood that it is within the scope of the invention to employ any known fabrication technique which will provide in the thin-walled partition the rupture characteristics which are essential to the intended use of the device.

Various changes and modifications in the insulating device herein disclosed will occur to those skilled in the art, and to the extent that such changes and modifications are embraced by the appended claims it is to be understood that they constitute part of the present invention.

I claim:

1. An insulating device for cable ends comprising an elongated plastic casing of generally cylindrical contour, twin-walled partition means substantially midway between the ends of said casing dividing the same into separate compartments said compartments containing liquid resin and liquid hardener components of a thermosetting resin system, means permanently closing one end of said casing, detachable closure means at the other end of said casing facilitating insertion of a cable end to rupture said thin-walled partition means for mixing of the resin components, the combined volume of said liquid resin and hardener components being equivalent to approximately ⅓ the volume of said casing, said resin and hardener being characterized as providing, when mixed, a resin composition which will gel in less than 2 minutes and reach a substantially complete cure in less than 5 minutes under atmospheric conditions, and said thin-walled partition means being characterized as rupturable by the application of about 1.5 to 3 pounds pressure with a 116″ probe.

2. An insulating device as defined in claim 1 wherein the liquid resin and hardener components are characterized as providing, when mixed, a resin composition which will gel in less than 1 minute and reach a substantially complete cure in less than 3 minutes under atmospheric conditions.

3. An insulating device as defined in claim 1 wherein the thermosetting resin system consists of two parts by weight of polyisocyanate having a molecular weight of 300 to 400 as the liquid resin component and one part by weight of NNN′N′-tetrakis-(2-hydroxypropyl) ethylene diamine as the liquid hardener component, providing when mixed, a resin composition which will gel in about 50 seconds and reach a substantially complete cure in less than 3 minutes at atmospheric conditions.

References Cited

UNITED STATES PATENTS

| | | |
|---|---|---|
| 766,587 | 8/1904 | Bradshaw. |
| 997,066 | 7/1911 | Krannichfeldt _____ 174—87 |
| 2,214,202 | 9/1940 | Odell et al. _____ 206—47 |
| 2,568,029 | 2/1951 | Seemar _____ 174—153 X |
| 3,003,084 | 10/1961 | Wilkinson. |
| 3,087,606 | 4/1963 | Bollmeier et al. |

FOREIGN PATENTS

| | | |
|---|---|---|
| 1,304,099 | 8/1962 | France. |
| 819,960 | 9/1959 | Great Britain. |

LARAMIE E. ASKIN, *Primary Examiner.*